Figure 1:
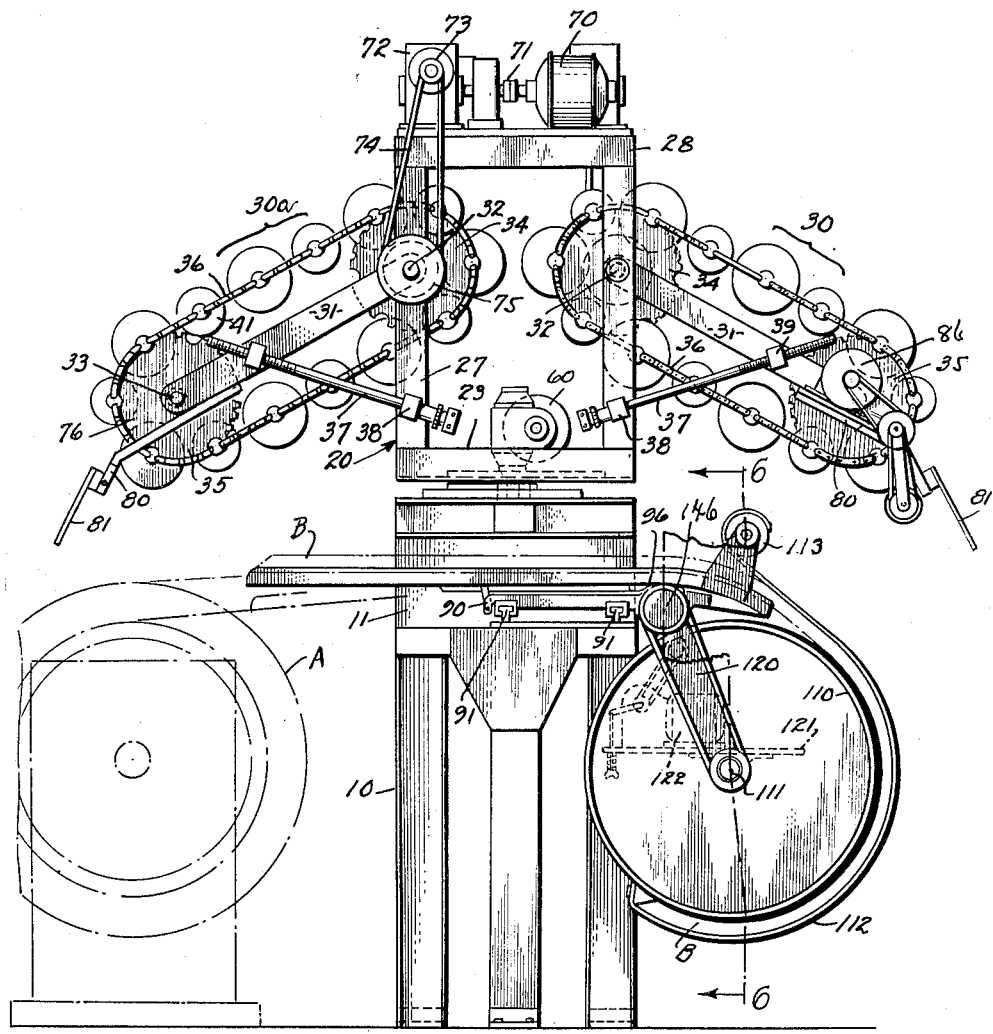

Sept. 12, 1950     E. C. KASTNER     2,521,728
SERVICING MACHINE FOR BUILDING TIRES Filed April 26, 1949     5 Sheets-Sheet 1

INVENTOR.
EDWARD C. KASTNER
BY
Bates, Teare, v McBean
Attorneys

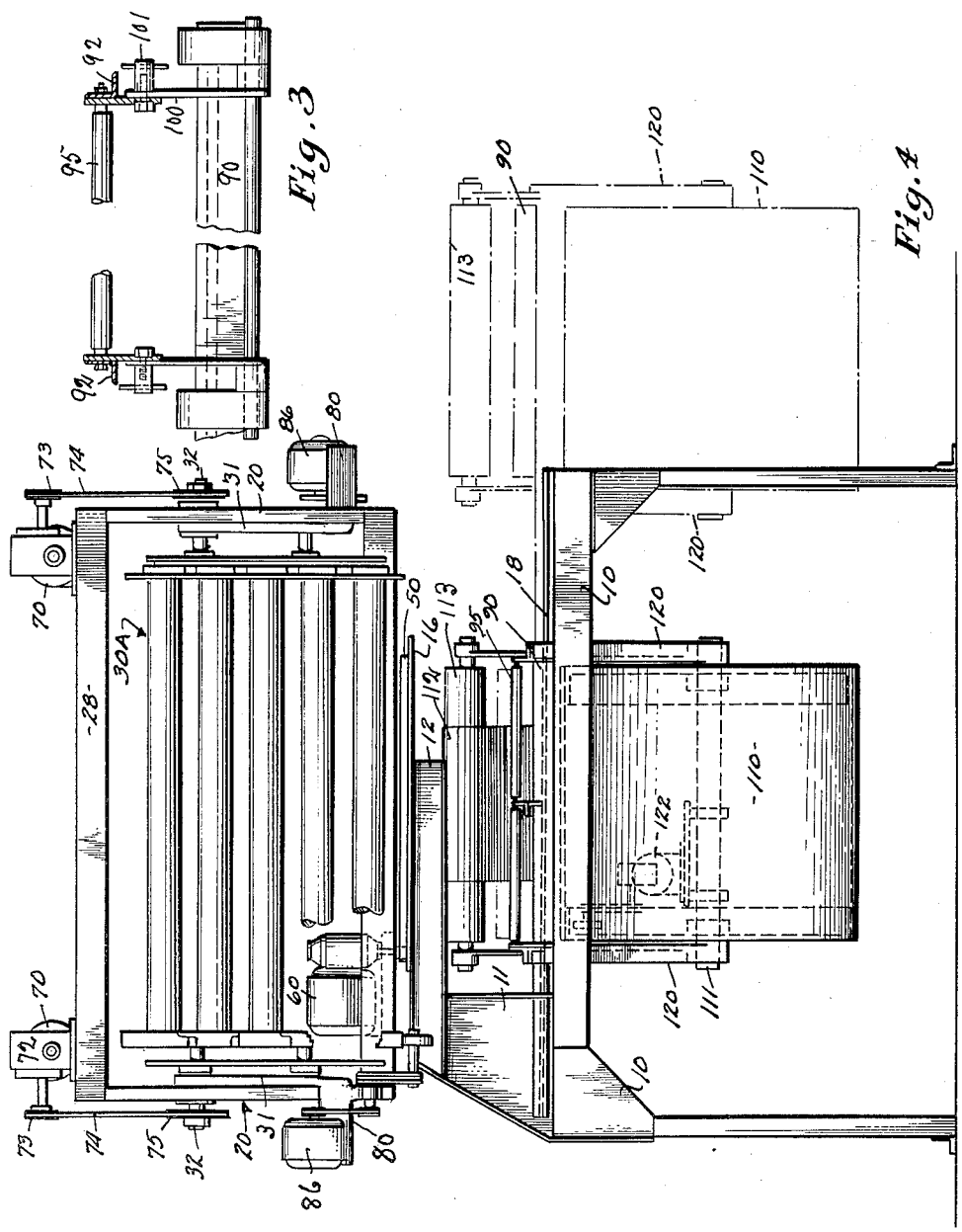

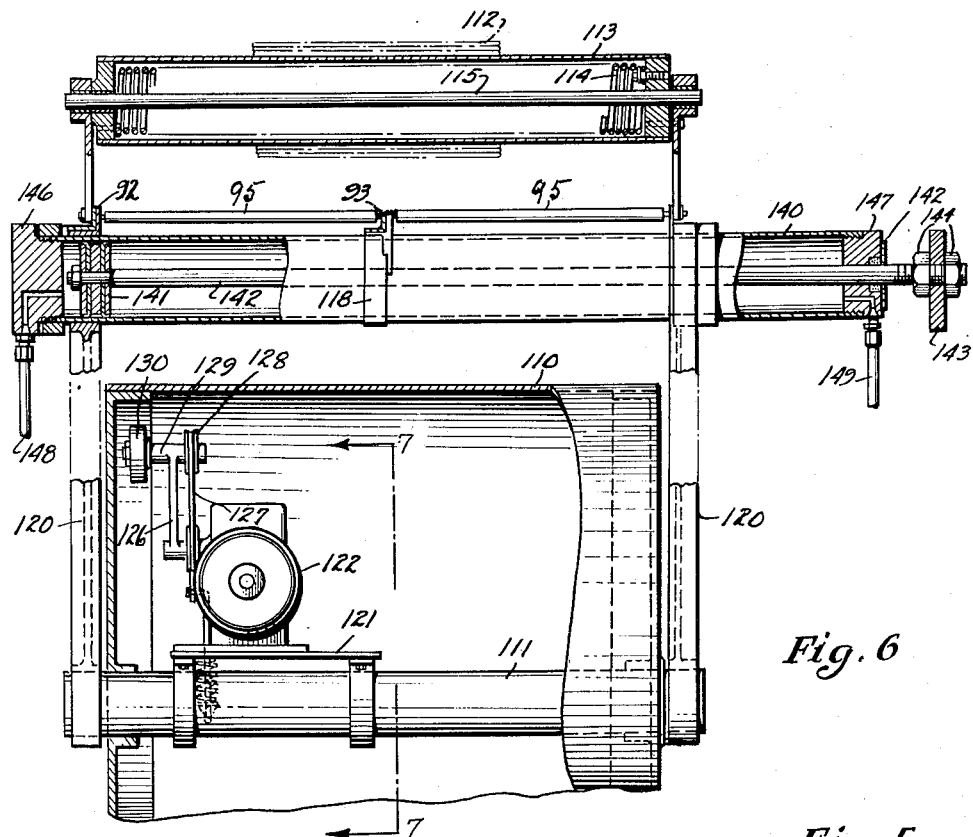

Sept. 12, 1950   E. C. KASTNER   2,521,728
SERVICING MACHINE FOR BUILDING TIRES
Filed April 26, 1949   5 Sheets-Sheet 4

INVENTOR.
EDWARD C. KASTNER
BY
Bates, Teare, & McBean
Attorneys

Sept. 12, 1950 E. C. KASTNER 2,521,728
SERVICING MACHINE FOR BUILDING TIRES
Filed April 26, 1949 5 Sheets-Sheet 5
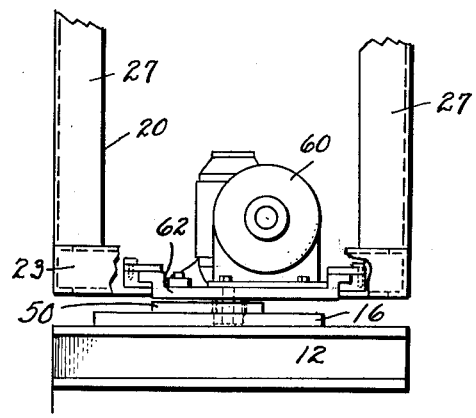
Fig.11
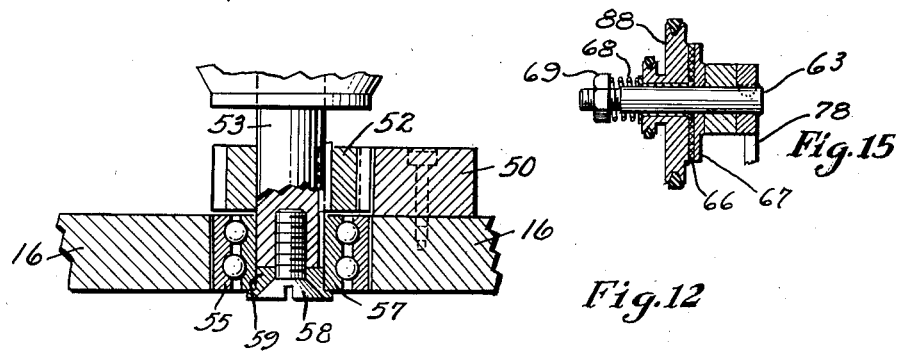
Fig.12
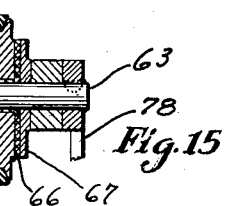
Fig.15
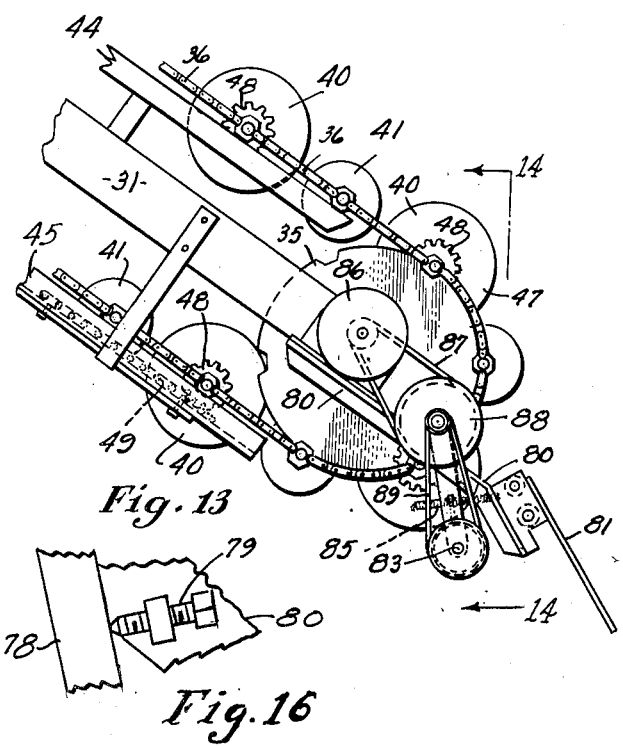
Fig.13
Fig.16
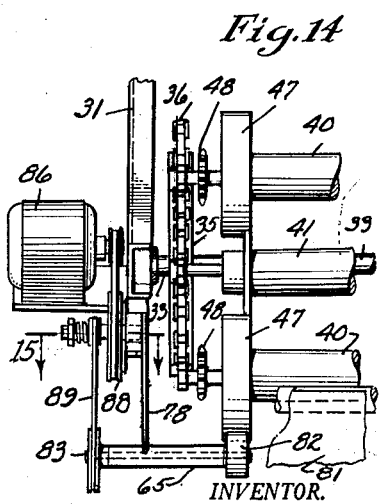
Fig.14
INVENTOR.
EDWARD C. KASTNER
BY Bates, Teare, & McDean
Attorneys Patented Sept. 12, 1950

2,521,728

UNITED STATES PATENT OFFICE 2,521,728

SERVICING MACHINE FOR BUILDING TIRES

Edward C. Kastner, Akron, Ohio, assignor to Akron Standard Mold Company, Akron, Ohio, a corporation of Ohio Application April 26, 1949, Serial No. 89,679

24 Claims. (Cl. 154—10)

This invention relates to apparatus for the ready storage and delivery of material for the building of a tire on a tire building drum and is an improvement of the apparatus illustrated in my copending application filed April 12, 1949, Serial No. 87,011. This apparatus has a turret mounted on a vertical axis and carrying two sets of storage rolls for strip material, so that either set may be loaded while strips are being withdrawn from the other set to the tire building drum. The apparatus also has means for carrying a tread strip and supplying it to the drum.

One of the objects of the invention is to provide the turret and its two roll-equipped carriers embodied in a simple construction, enabling the strip carrying rolls to be presented for use in a position readily accessible for loading and for withdrawal of strips to the tire building drum, such carriers being adjustable in position as may be most convenient for different sizes of drums.

Another object of the invention is to provide means for turning the turret at 180° on its vertical axis, such means having the capacity of starting the turning movement slowly then accelerating the movement to a region near the mid-position and then decelerating it to the final stopping point, whereby troublesome jerks on the mechanism and extra load on the turning motor are avoided.

Still another object of the invention is to provide efficient means for mounting a heavy tread strip in a storage device after which such device is operable to feed the tread strip by power to the tire building drum. Such storage device is combined with a conveyor which is adjustable as to its discharge position for different size tire building drums. The conveyor is also shiftable to the side of the machine to allow the ready mounting of the tread strip.

The mechanism by which I accomplish the above outlined objects, and others contributing to the efficiency of the machine, will be apparent from the following detailed description of a preferred embodiment shown in the drawings.

Figure 2:
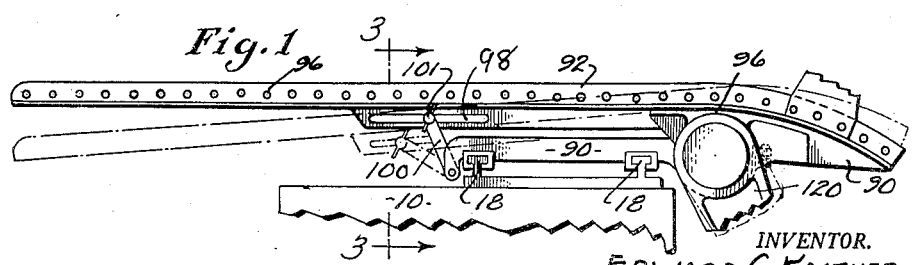
Figure 8:
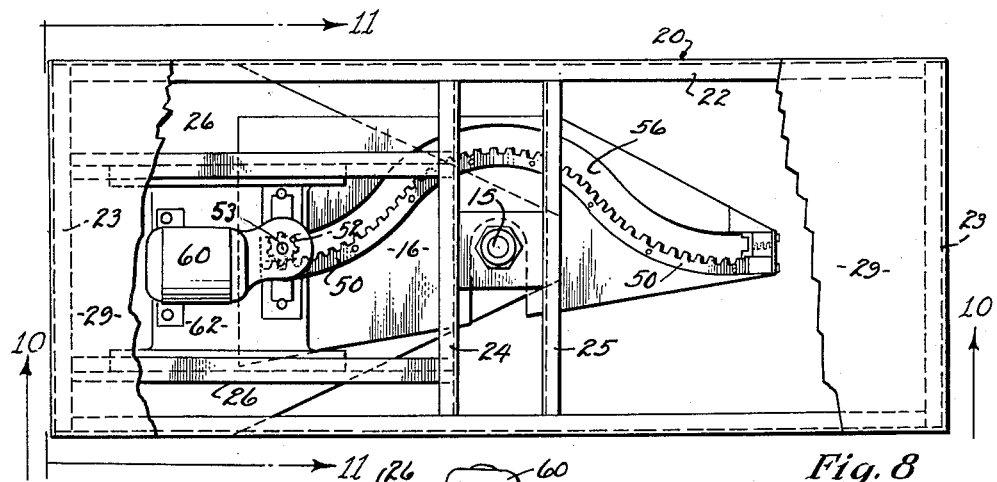
Figure 9:
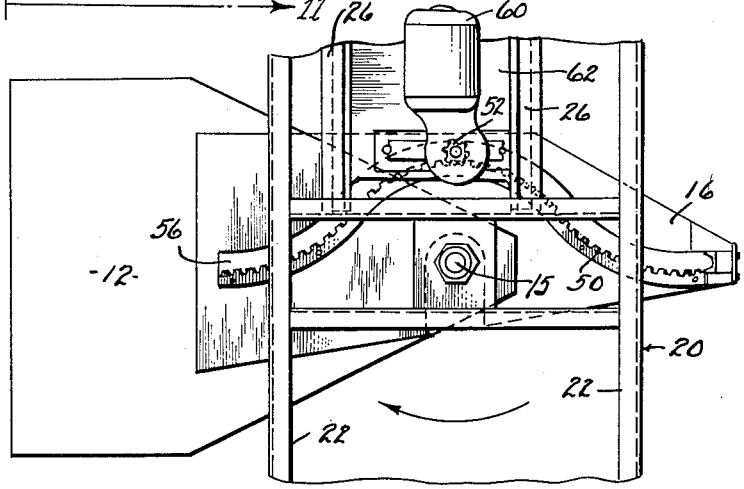
Figure 10:
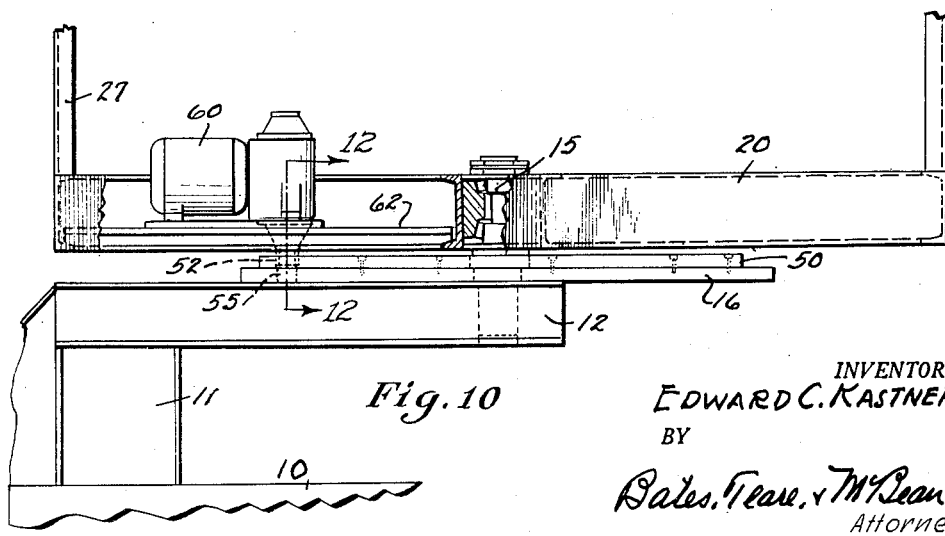

In the drawings, Fig. 1 is a side elevation of the servicing machine, with some of the parts omitted; Fig. 2 is an enlarged view of the tread-strip conveyor in a plane parallel with Fig. 1; Fig. 3 is a transverse section of the conveyor, as indicated by the line 3—3 on Fig. 2, the view being intermediately broken out; Fig. 4 is a front elevation of the machine, showing in broken lines the loading position of the tread strip conveyor; Fig. 5 is a perspective view of a portion of the conveyor; Fig. 6 is a sectional elevation of the tread strip storage member on the conveyor, the section being on offset vertical planes, as indicated by the line 6—6 on Fig. 1; Fig. 7 is a radial section through the tread strip storage drum, as indicated by the line 7—7 on Fig. 6; Fig. 8 is a plan of the turret and its turning mechanism, the top plate of the turret being broken away and various parts carried by the turret omitted; Fig. 9 is a plan of a portion of the same parts as shown in Fig. 8 but turned at 90° therefrom; Fig. 10 is a sectional elevation of the turret, as indicated by the lines 10 and 10 on Fig. 8; Fig. 11 is an end view of the lower portion of the turret and its supporting means, as indicated by the line 11—11 on Fig. 8; Fig. 12 is a vertical section on a larger scale through the driving pinion of the turret rotating mechanism, as indicated by the line 12—12 on Fig. 10; Fig. 13 is an elevation of the lower portion of either of stock carriers with its chain-connected rolls and its stock loading mechanism; Fig. 14 is a fragmentary view of the stock loading mechanism mounted at the lower end of each carrier, as indicated by the line 14—14 on Fig. 13; Fig. 15 is a section taken on a plane indicated by the line 15—15 in Fig. 14, and Fig. 16 is a detail view of a portion of the rewind mechanism.

As shown in Figs. 1 and 4, 10 indicates the supporting frame of my machine, 20 the turret mounted on a vertical axis on the frame 10, and 30 and 30a two identical carriers for strip stock. Either of these carriers may be positioned for cooperation with a tire building drum indicated at A in Fig. 1. The carrier in the latter position is designated as 30a; the other carrier 30 at this time stands in position to receive stock on its stock holding rolls.

The upper portion of the frame is open at the front and at one side, by reason of having an upward extension 11 at one side carrying a cantilevered horizontal portion 12. In this open space is mounted the conveyor which, as hereinafter explained, may be shifted to the side of the machine for loading or may be positioned in registration with the drum for use. The conveyor carries a rotative storage device adapted to house a portion of a tread strip, indicated at B in Fig. 1, and thereafter feed such strip to the tire building drum.

I will first describe the turret and its turning mechanism. This turret as shown is an open rectangular structure made principally of spaced flanged bars secured together, and comprising a base, a top and four vertical corner members. As shown in Fig. 8 the turret base has two lower longitudinal channel-shaped sills 22 and two channel-shaped end sills 23, two intermediate cross bars 24, 25 and two longitudinal bars 26 extending from the cross bar 24 to the adjacent end sill 23. Vertical posts 27 extend upwardly from the corners of the base and are joined to a rectangular top frame 28 carrying a top plate 29.

The cantilevered top member 12 of the frame is a built-up table-like structure rigidly carrying near its end a vertical pivot stud 15 on which the turret is mounted, preferably by a roller bearing as indicated in Fig. 10.

Rigidly secured to the top of the frame portion 12 and projecting beyond it is an extension plate 16. Mounted on this plate is a protuberant rack 50 of approximately sinusoidal form. The extreme portions on opposite sides of the pivot 15 of the turret start inwardly directly toward the pivot and then gradually curve outwardly in concave form. The central portion of the rack is a convex arc swung substantially about the axis as a center, and the intermediate portions are reverse curves connecting the convex central portion with the concave end portions. Thus, the rack teeth are at constantly decreasing distances from the axis, as one progresses from either end of the rack to the central region.

Meshing with the curved rack 50 is a pinion 52 on a vertical shaft 53 driven as about to be described. The shaft 53 extends downwardly below the rack and carries a guiding roller 55, occupying a slot 56 in the plate 16. This slot is of the same sinusoidal form as the rack and presents guiding edges parallel with the rack teeth.

As shown in Fig. 12, the guiding roler 55 is the outer raceway of a ball bearing mounted on the shaft 53, the inner raceway 57 of this ball bearing being shown as fixed to the shaft and held in place by a screw 58 mounted on the shaft and carrying retaining washer 59 which overlaps this inner raceway.

60 in Figs. 8 to 11, indicates a motor, driving the pinion 52 through intermediate reduction gearing. This motor is mounted on a plate 62 which is slidably mounted in ways on the two bars 26 in the base of the turret. It will be seen that the groove 56 and the guiding roller on the lower end of the shaft maintains the pinion constantly in mesh with the rack teeth. By mounting the pinion and its driving motor and connecting gearing so that they may slide toward and from the axis of the turret the result is that when the pinion is rotated it will travel along the rack.

It follows from the construction described that when the motor 60 is energized and the pinion 52 thereby rotating in the proper direction, the pinion pulls itself together with the reduction gearing, the motor and supporting plate 62 along the rack. This movement causes the turret to gradually s ing as the pinion travels. The speed of swinging increases from zero until the turret has been given a quarter turn as shown in Fig. 9. Thereafter as the pinion is leaving the crest of the rack the turning movement of the turret gradually decreases until the turret comes to rest in a position 180° different from its original position.

It will be seen that the position of the guiding roller 55 in the substantially straight end portion of the slot 56 provides an automatic lock for the turret at either extreme of its movement. This holds the turret with the stock carriers in active position, one for receiving the stock and the other for delivering it. Then when the motor is actuated its continual movement turns the turret to interchange the position of the two carriers and hold them in the new position.

Reverting to the two identical carriers 30 and 30a supported by the turret, each of these carriers comprises a pair of arms 31 pivotally attached to the frame being loose on a horizontal shaft 32; the arms extend diagonally downward and at their lower ends are connected by a horizontal shaft 33. On each of these shafts 32 and 33 is mounted a pair of sprocket wheels 34 and 35 over which extend a pair of sprocket chains 36. The two chains on each carrier support alternately stock carrying rolls 40 and liner carrying rolls 41, the liners being adapted to be rolled up with the stock on the stock carrying rolls in the usual manner.

The shafts of the various rolls 40 and 41 project beyond the chains and engage stationarily inclined guides to support those rolls during their travel in the turret. As shown the two guiding supports are angle bars 44 and 45 (Fig. 13) carried by the arms 31.

The two carrier arms 31 are supported in the inclined position shown in Fig. 1, by rods 37 which are rotatably mounted in blocks 38 pivotally carried by the turret, and adjacent their other ends these rods are threaded into nuts 39 pivoted to the arms. This enables the ready adjustment of the incline of the carriers. This adjustment is useful in bringing the loading end of the carrier, when discharging, into most convenient location with reference to various sizes of tire building drums.

The chains of each carrier are driven by an individual motor 70 (Figs. 1 and 4) mounted on top of the turret and operating by coupled shafts 71 to drive reduction gearing in a housing 72 which reduction gearing terminates in a belt pulley 73 connected by a belt 74 with a pulley 75 on the shaft 32 carrying the upper sprocket wheels and supporting and driving the chains.

The different supply rolls are loaded from the lower end of the carrier shown at 30 in the right hand portion of Fig. 1. This loading mechanism is supported by extension bars 80 carried by and projecting downwardly from the arms 31. These extension bars carry inclined tables 81 up which the stock may be fed to the rolls to supply them or down which the stock may travel from a roll to the tire drum.

Each stock roll has a circular head 47 (Figs. 13 and 14) and the head of the lowermost roll may be engaged by a friction pulley 82 on a shaft 83 mounted in a bearing 65 carried by an arm 78. A spring 85 maintains the arm against a stop 79 and thus maintains the roller 82 normally out of contact with the adjacent roll head 47. Mounted on the extension 80 is a motor 86 which is drivingly connected to the shaft 83. I have shown a belt 87 from the motor pulley to an intermediate pulley 88 and another belt 89 from a pulley rigid with the pulley 88 to a pulley on the shaft 83. The pulley 88 is arranged to turn freely on shaft 63 (Fig. 15) and the shaft in turn is affixed to an arm 78 which projects upwardly from the bearing 65. A frictional resistance to rotation of the pulley 88 is preferably provided by a friction disc 66 (Fig. 15) which is disposed between the pulley 88 and a disc 67, the latter of which is fixed to the shaft 63. The extent of the frictional resistance may be adjusted by means of a spring 68 and a nut 69, the latter of which is threaded onto the shaft 63.

The construction just described enables the lowermost storage roll 40 to be rotated in the wind-up direction to load onto it stock fed upwardly on the table 81 at the loading side and also enables the lowermost roll at the delivery side to be rotated in the delivering direction to deliver the stock downwardly toward the tire building drum.

When the delivered stock depending from the lowermost delivery roll has been sufficiently mounted on the tire building drum, the stock is severed between such roll and drum. This leaves a depending flap of the stock from the roll as the chains are operated in that carrier to bring a new roll into position. To wind up this stock automatically I provide pinions 48 (Figs. 13 and 14) on one end of the supply rolls, and I provide on the lower guiding bar 45 a short rack 49 (which may be a short anchored length of sprocket chain). The pinion 48 of the particular roll from which the end of the stock depends in traveling from its position of use toward the under reach of the carrier, engages the stationary rack, and this automatically rotates that particular roll in the direction to wind up the projecting portion of the stock.

In addition to delivering the stock to the tire building drum my mechanism conveys to it a tread strip to be mounted on the drum in association with the strips from the supply mechanism described. This conveyor comprises a horizontal frame 90 (Figs. 1, 2, 4 and 5) slidably supported on transverse tracks 18 carried by the machine frame 10, and a roller conveyor mounted on the frame 90 to support tread strip B.

The conveyor proper comprises a pair of parallel horizontal bars 92 at the edge of the conveyor, an intermediate bar 93 parallel with the edge bars, suitable cross bars 94, and rollers 95 extending transversely of the bars 92 and 93. This conveyor is pivoted in the region indicated at 96 in Figs. 1 and 2 to the conveyor frame 90.

The roller carrying frame is adjustable up-and-down at the end adjacent the tire building drum, as indicated by broken lines in Figs. 1 and 2, to enable the tread strip to be discharged substantially tangentially of drums of various sizes. To effect this adjustment, I support the conveyor bars at their front by arms 100 pivoted at their lower ends to the conveyor frame 90, and at their upper ends carrying bolts slidable in slots 98 carried by the respective bars on their undersides. The bolts or nuts thereon may be clamped, as desired, by suitable wing members 101 to lock them to the bars and thus support the bars in any desired position.

As heretofore mentioned the general frame of the machine has a space beneath the frame table 12 which carries the turret, this space being open at opposite ends and at one side. The tracks 18 extend into this open space. Thus the carrier mounted on these tracks may be positioned in the open space in registration with the tire-building drum or may be shifted to the side thereof, as indicated by broken lines in Fig. 4, to allow the tread strip to be readily laid on the conveyor. This shifting mechanism will be hereinafter described.

As tread strips may be quite heavy and of considerable length for a large size tire, I provide means for winding up a portion of the tread strip at the end of the conveyor opposite the tire building drum, and for feeding the same from its storage member lengthwise of the conveyor when it is desired to use the tread strip on the tire building drum. This tread strip storage mechanism is illustrated in Figs. 1, 4, 6 and 7.

The storage member for the tread strip comprises a drum 110 mounted on a stationary horizontal shaft 111 carried by the conveyor frame, the drum being partially rotatable in either direction. Attached to this drum is a strap 112, the upper end of which is wound around a spring barrel carried by the conveyor and comprising a rotatable hollow cylinder 113 (Fig. 6) and an internal helical spring 114 anchored at its opposite ends to the cylinder and to the stationary supporting shaft 115. This strap, constantly held taut, provides a snug arcuate space between the drum surface and strap into which the end portion of the tread strip B may extend, as indicated in Fig. 1.

The tread strip storage drum 110 has its shaft mounted in a pair of arms 120 rigidly depending from the carrier frame 90. The drum is hollow and within the drum the shaft 111 carries a stationary platform 121 on which is mounted a motor 122 having a worm shaft 123, Fig. 7, engaging a worm wheel 124. Pivoted on the shaft of this worm wheel is an arm 126. A pulley on the shaft is connected by a belt 127 with a pulley 128 on a shaft mounted in a bearing 129 at the other end of the arm 126. This shaft carries a friction roller 130 which is held against the interior of the drum 120 by a spring 131 acting on a rod 132 connected to an arm 133 rigid with the arm 126.

The shaft 111 being non-rotatably mounted in the arms 120, and the drum being rotatable on the shaft, it follows that the friction roller 130 maintained against the interior of the drum, will turn the drum in one direction or the other when the motor is correspondingly driven.

In loading my conveyor, it is shifted to the position shown in broken lines in Fig. 4, and the tread strip is laid manually on the rollers of the conveyor in front of the strap 112. At this time the drum 110 is in a position about 180° different from that shown in Fig. 1. Then as the drum is rotated in the clockwise direction in Fig. 1 the tread strip travels into the space between the strap and drum and becomes wound up on the exterior of the drum for about half the circumference of the drum, the drum being then in the position indicated in Fig. 1. During this travel the drum pulls the strap 112 and the spring barrel 113 turns in the counter-clockwise direction to wind up its spring. The final position of the other end of the tread strip is about at the other end of the conveyor.

Now when it is desired to feed the tread strip to the tire building drum the motor 122 is rotated in the opposite direction from its winding-up movement and this feeds the tread strip along the conveyor to the tire building drum, the spring in the barrel at this time maintaining the strap 112 taut.

To shift the entire conveyor and tread building drum from the operating position shown in full lines in Fig. 4 to the loading position shown in broken lines in that figure, I provide mechanism best illustrated in Fig. 6. This mechanism comprises a cylinder 140 rigidly mounted in the conveyor frame and having within it a piston 141 on a rod 142, the other end of which is secured to a bracket 143 rigidly carried by the machine frame. As shown in Fig. 6, the rod is threaded adjacent its free end and a pair of nuts 144 adjustably clamp it to the bracket.

I provide passageways in the respective heads 146 and 147 of the cylinder, and suitable nipples connect flexible conduits 148 and 149 with these passages. By this means fluid under pressure, preferably compressed air, is admitted to the cylinder on one side or the other of the piston as desired, and thus the entire conveyor may be shifted laterally from active to loading position and vice versa.

To avoid making the conveyor rollers too heavy, as they extend for a distance sufficient to receive a comparatively wide tread strip, I prefer to make these rollers in two sets, each of only half the width of the conveyor, as shown in Figs. 4 and 5. To this end I provide the intermediate frame bar 93 heretofore mentioned and two sets of rollers 95 are journaled at their adjacent ends at opposite sides of this bar and at their far ends in the two extreme bars 92. The uppermost surface of these rollers extend above the top edge of the intermediate bar 93 as indicated in Figs. 4 and 5. The rear end of the intermediate bar 93 is supported by the cylinder 140. As shown in Fig. 6, a suitable strap 118 surrounds this cylinder and carries an upward extension secured to the bar 93.

It will be understood from the description given, and the disclosure of the drawings, that I have provided a simple machine adapted for the ready storage and discharge both of strip stock and of a tread strip, both in convenient position for use on an adjacent tire building drum. My machine carries the stock rolls in very convenient position for loading and for unloading and has simple mechanism for shifting the position of the rolls in the respective carriers. While these carriers project in opposite directions from the turret and are free at their outer ends, there is no jar on the carriers, as the turret rotates, which, by reason of the mechanism I have provided, starts the rotation with a very slow movement, gradually increases it and then decreases it to the final position. The mechanism provides for the ready loading of the tread strip and for the unloading of it and for forcing it toward the tire building drum under power. This enables the ready handling of a very heavy tread strip.

I claim:

1. In a servicing machine, the combination of a frame, a turret above the frame pivoted thereto on a vertical axis, a pair of carriers for stock including arms secured at their upper ends to opposite sides of the turret and extending diagonally downward therefrom, a series of rolls movably supported on each carrier, and supporting means engaging intermediate portions of the carriers while leaving their lower ends free.

2. In a servicing machine, the combination of a frame, a turret above the frame pivoted thereto on a vertical axis, a pair of carriers for stock including arms pivoted at their upper ends to opposite sides of the turret and extending diagonally downward therefrom, a series of rolls movably supported on each carrier, and adjustable supporting means connecting the lower portions of the arms with the turret.

3. In a servicing machine, the combination of a frame, a turret above the frame pivoted thereto on a vertical axis, a pair of carriers mounted on the turret, each carrier comprising a pair of spaced arms pivoted at their upper ends to the turret and extending outwardly and diagonally downwardly from the turret, shafts near the upper and lower ends of the arms, a pair of wheels on each shaft, endless chains on aligned wheels of the two shafts, a series of stock carrying rolls carried by the chains, supporting bars carried by the arms extending parallel therewith coacting with the rolls to support the same in their travel parallel with the arms.

4. The combination of a frame, a turret mounted on the frame on the axis, a pair of stock carriers mounted on the turret, and means for turning the turret first at an accelerating speed and then a decelerating speed to interchange the position of the carriers.

5. In a servicing machine, the combination of a frame, a turret above the frame connected thereto on a vertical axis, a pair of carriers for individual stock mounted in diametrically opposed relation on the turret and means for turning the turret 180° to interchange the position of the carriers, said turning means being mounted in part on the frame and in part on the turret and operating to swing the turret from a zero position at an accelerating speed to a mid-region and then at a decelerating speed to a final position.

6. The combination of a frame, a turret mounted thereon on an axis allowing the turret to turn 180°, carriers for stock mounted on the turret on opposite sides thereof, means for turning the turret 180°, said means being mounted in part on the frame and in part on the turret and including a rack with its teeth at gradually varying distances from the axis, and a bodily shiftable rotary pinion coacting with the rack.

7. The combination of a frame, a turret mounted thereon on an axis allowing the turret to turn, carriers for stock mounted on the turret, means for turning the turret, said means being mounted in part on the frame and in part on the turret and including a substantially sinusoidal rack and a shiftably mounted rotary pinion coacting therewith.

8. The combination of a frame, a turret above the frame mounted thereon on a vertical axis, carriers at opposite sides of the frame, each carrier comprising a set of stock carrying rolls, a sinusoidal rack in a horizontal plane carried on top of the frame, a pinion meshing with the rack being shiftably mounted on the vertical shaft in the turret, and a motor on the turret for rotating the pinion.

9. The combination of a frame member, a turret member mounted above the frame member on an axis, a curved rack carried by one of said members, a curved guideway carried by that member and extending in parallelism with the rack, a driving shaft on the other of said members carrying a pinion meshing with the rack and carrying a roller movably engaging said guideway.

10. The combination of a frame, a turret mounted above the frame on a vertical axis, a substantially sinusoidal rack carried in a horizontal plane at the top of the frame, a substantially sinusoidal guideway extending in parallelism with the rack, a driving shaft shiftably mounted on the turret and carrying a pinion meshing with the rack and carrying a guiding member movably engaging said guideway.

11. In a servicing machine, the combination of a frame having a flat top, a turret above the frame pivoted thereto on a vertical axis, a sinusoidal rack carried at the top of the frame in a horizontal plane, a parallel sinusoidal guideway carried by the frame below the rack, a vertical driving shaft shiftably mounted in the turret, a roller on the lower end of the driving shaft coacting with said guideway, and a pinion on the driving shaft above the roller meshing with the rack.

12. In the combination of a frame, a turret pivoted thereon and means for turning the turret, said means being mounted in part on the frame and in part on the turret and comprising a curved rack, a pinion meshing with the rack, a motor for driving the pinion, and a slidable support carrying the pinion.

13. In a servicing machine, the combination of a frame, a turret pivoted thereto, a pair of stock carriers on opposite sides of the turret, means for turning the turret 180°, said means being mounted in part on the frame and in part on the turret and comprising a sinusoidal rack, a rotary pinion meshing with the rack, a motor and driving connection between the motor and pinion, said pinion, motor and driving connection being slidable as a unit toward and from the axis of rotation.

14. In a servicing machine, the combination of a frame, a turret above the frame and connected thereto on a vertical axis, a pair of stock carriers respectively on diametrically opposite sides of the turret, a stationary sinusoidal rack carried in a horizontal plane by the frame, a sinusoidal guideway adjacent the rack, a member slidably mounted in the base of the turret movable toward and from the axis of rotation, a motor on said slidable member, a shaft on the slidable member geared with the motor, a pinion on the shaft meshing with the rack and a roller on the shaft coacting with the guideway.

15. In a servicing machine, the combination of a frame, a turret above the frame and mounted thereon on a vertical axis, a pair of stock carriers on opposite sides of the frame, means for turning the turret 180° comprising a rack curved about the axis and having end portions in a line substantially intersecting the axis, a guiding slot parallel with the rack, a driving shaft, a pinion on the shaft meshing with the rack and means on the shaft extending into the slot and locking the turret in either extreme position thereof.

16. In a servicing machine, the combination of a frame, a strip carrying means supported by the frame and adapted to be in position to deliver stock to a tire building drum, a conveyor carried by the frame and adapted to support a tread strip for delivery to the same tire building drum, said conveyor having a pair of parallel edge bars and an intermediate parallel bar, and two sets of rollers mounted at their outer ends at the edge bars and at their adjacent ends in the intermediate bar, said rollers being adapted to support the tread strip.

17. In a servicing machine, the combination of a frame, a tread strip conveyor carried thereby and adapted to deliver a tread strip to a tire building drum, said conveyor comprising a substantially horizontal support for a portion of the tread strip, a rotative storage member for a portion of the strip, and means for turning said storage member about an axis to feed the tread strip along the conveyor.

18. The combination of a frame, a conveyor carried thereby comprising a support for a portion of a tread strip, a rotative drum, a strap on the exterior of the drum secured thereto, whereby a portion of the tread strip may be received between the drum and strap, and means for turning the drum to shove the tread strip along the conveyor.

19. In a servicing machine, the combination of a frame, a conveyor carried thereby comprising a roller support for a portion of a tread strip, a rotative drum carried by the conveyor, a strap exterior of the drum adapted to provide an arcuate channel for the reception of a portion of the tread strip between the drum and strap, a spring barrel to which the other end of the strap is anchored for keeping the strap taut, and means for turning the drum in either direction to mount a portion of the tread strip between the drum and strap or to deliver the tread strip along the conveyor according to the direction of rotation.

20. In a servicing machine, the combination of a frame, a tread strip conveyor carried thereby comprising a support for a portion of the tread strip and a drum having a strap anchored to its exterior for providing an arcuate channel to receive a portion of the tread strip, means for maintaining the strap taut, said drum being hollow and mounted on a stationary shaft, a motor mounted on said shaft within the drum, a friction roller spring-pressed against the interior of the drum, and gearing connecting the motor with the roller, whereby the motor may rotate the drum.

21. In a servicing machine, the combination of a frame, a rotary turret thereon, a plurality of stock carriers in the turret, each of which may be brought into active servicing position by rotation of the turret, a tread strip conveyor, means for moving it laterally from an exposed position into position beneath the turret.

22. In a servicing machine, the combination of a frame, a tread strip conveyor carried thereby and adapted to deliver a tread strip to a tire building drum, said conveyor comprising a support for a portion of the tread strip and a rotative storage member for a portion of the strip, means for turning said storage member about an axis to feed the tread strip along the conveyor toward the drum, and means for shifting the conveyor and storage member as a unit into and out of registration with the tire building drum.

23. In a servicing machine, the combination with strip carrying mechanism adapted to supply strip stock to a tire building machine, of a conveyor for feeding a tread strip to the same tire building machine, said conveyor being mounted to move laterally from the exposed position to a position for delivering a tread to the tire building machine, and a piston and cylinder, one connected to the conveyor and the other to the frame of the stock carrying machine for shifting the conveyor laterally.

24. In a servicing machine, the combination with strip carrying mechanism adapted to supply strip stock to a tire building machine, of a conveyor for feeding a tread strip to the same tire building machine, said conveyor being mounted to move laterally from the exposed position to a position registering with the tire building machine, said conveyor having a roller support for the front portion of the tread strip and a rotative storage member adapted to carry the rear portion of such tread strip, means for turning said storage member to deliver the tread strip along the roller support, and a piston and cylinder, one connected to the conveyor and the other to the frame of the stock carrying machine for shifting the conveyor with its storage member laterally.

EDWARD C. KASTNER.

(References on following page)

REFERENCES CITED

The following references are of record in the file of this patent:

UNITED STATES PATENTS

| Number | Name | Date |
|---|---|---|
| 463,977 | Allen | Nov. 24, 1891 |
| 601,495 | Carnell et al. | Mar. 29, 1898 |
| 1,353,934 | Morris | Sept. 28, 1920 |
| 1,507,908 | Crawford | Sept. 9, 1924 |
| 1,966,087 | Bostwick | July 10, 1934 |
| 2,242,810 | Bostwick | May 20, 1941 |
| 2,346,903 | Caffrey | Apr. 18, 1944 |
| 2,365,341 | Haren et al. | Dec. 19, 1944 |
| 2,395,020 | Sternad | Feb. 19, 1946 |
| 2,473,067 | Miller | June 14, 1949 |